United States Patent
Rassool

(10) Patent No.: US 11,682,198 B2
(45) Date of Patent: Jun. 20, 2023

(54) METHODS AND SYSTEMS FOR FACIAL RECOGNITION USING MOTION VECTOR TRAINED MODEL

(71) Applicant: RealNetworks LLC, Seattle, WA (US)

(72) Inventor: Reza Rassool, Seattle, WA (US)

(73) Assignee: REALNETWORKS LLC, Seattle, WA (US)

( * ) Notice: Subject to any disclaimer, the term of this patent is extended or adjusted under 35 U.S.C. 154(b) by 0 days.

(21) Appl. No.: 17/694,536

(22) Filed: Mar. 14, 2022

(65) Prior Publication Data

US 2022/0207916 A1 Jun. 30, 2022

Related U.S. Application Data

(63) Continuation of application No. 16/712,579, filed on Dec. 12, 2019, now Pat. No. 11,275,928.

(51) Int. Cl.

| G06V 10/82 | (2022.01) |
| G06F 21/32 | (2013.01) |
| G06N 3/04 | (2023.01) |
| G06N 3/08 | (2023.01) |
| G06V 40/16 | (2022.01) |
| G06V 20/40 | (2022.01) |
| G06F 18/214 | (2023.01) |
| G06V 30/19 | (2022.01) |

(Continued)

(52) U.S. Cl.
CPC ............ *G06V 10/82* (2022.01); *G06F 18/214* (2023.01); *G06F 21/32* (2013.01); *G06N 3/04* (2013.01);
(Continued)

(58) Field of Classification Search
CPC ........... G06K 9/00288; G06K 9/00268; G06K 9/00744; G06K 9/66; G06K 9/6256; G06N 3/08; G06N 3/04; G06F 21/32; G06F 18/214; G06V 10/82; G06V 20/46; G06V 30/19173; G06V 40/168; G06V 40/172; G06V 40/20; G06V 40/40
See application file for complete search history.

(56) References Cited

U.S. PATENT DOCUMENTS

2009/0080715 A1* 3/2009 van Beek ......... G08B 13/19689
   348/E7.087
2019/0279393 A1* 9/2019 Ciuc .................... G06V 40/165

FOREIGN PATENT DOCUMENTS

| GB | 2569794 A | 7/2019 |
| KR | 10-2054058 | 12/2019 |

OTHER PUBLICATIONS

Kim et al, "Spatio-temporal representation for face authentication by using multi-task learning with human attributes", IEEE, 2016 (Year: 2016).*

(Continued)

*Primary Examiner* — Ruiping Li
(74) *Attorney, Agent, or Firm* — Seed IP Law Group LLP

(57) ABSTRACT

Systems and methods are provided for determining a candidate identity of a person in video data based on a biometric motion signature corresponding to motion of a face of the person in the video data. Motion information is obtained corresponding to motion of the face in the video data. The motion information is provided as input to a neural network and the neural network generates the biometric motion signature in response. The biometric motion signature is compared with a plurality of biometric signatures stored in data storage. The candidate identity of the person is determined as a result of a correspondence between the biometric motion signature and a stored biometric signature of the plurality of biometric signatures.

20 Claims, 9 Drawing Sheets

(51) Int. Cl.
   *G06V 40/20* (2022.01)
   *G06V 40/40* (2022.01)
(52) U.S. Cl.
   CPC .............. *G06N 3/08* (2013.01); *G06V 20/46* (2022.01); *G06V 30/19173* (2022.01); *G06V 40/168* (2022.01); *G06V 40/172* (2022.01); *G06V 40/20* (2022.01); *G06V 40/40* (2022.01)

(56) References Cited

OTHER PUBLICATIONS

Liu et al, "Two-Stream Transformer Networks for Video-Based Face Alignment", IEEE, 2018. (Year: 2018).*
Chen et al., "Person Identification Using Facial Motion," Institute of Information Science, IEEE 2001, 18 pages.
Hadid et al., "An Experimental Investigation about the Integration of Facial Dynamics in Video-Based Face Recognition," Machine Vision Group, Infotech Oulu and Department of Electrical and Information Engineering, Electronic Letters on Computer Vision and Image Analysis, 2005, 13 pages.
Kim et al., "Spatio-Temporal Representation for Face Authentication by Using Multi-Task Learning with Human Attributes," Image and Video Systems Lab, School of Electrical Engineering, IEEE 2016, 6 pages.
Ye et al., "Towards General Motion-Based Face Recognition," 2010 IEEE Computer Society Conference on Computer Vision and Pattern Recognition, Jun. 13-18, 2010, 8 pages.
Zhang et al., "Real-time Recognition with Enhanced Motion Vector CNNs," arXiv:1604.07669v1 [cs.CV], Apr. 26, 2016, 9 pages.

* cited by examiner

METHODS AND SYSTEMS FOR FACIAL RECOGNITION USING MOTION VECTOR TRAINED MODEL

BACKGROUND

Technical Field

The present disclosure relates to systems and methods for processing facial images.

Description of the Related Art

Facial recognition has become an increasingly popular method of identifying a person or verifying an asserted identity due to the convenience for users and the relative ease to implement such systems. However, the ease and convenience of at least some facial biometric recognition technologies are offset by inherent deficiencies. Some previous generations of devices and systems, for example, were configured to provide access in response to capturing a static image depicting an authorized user's face. These systems are typically rigid and require a user's face to be in an optimal position (e.g., directly facing the camera) to recognize the person depicted in the static image. Systems implementing static face image recognition may also be vulnerable to unauthorized access by providing a photograph of the authorized user's face.

Previous face recognition systems are also inefficient in several respects. Some facial recognition systems require additional verification to demonstrate that a user is physically present to protect against the aforementioned photograph vulnerability, such as by providing a fingerprint or eliciting a particular gesture. This can be annoying to the user and involves additional effort and cost to implement. These systems also fail to capture or consider contextual information that could be used to recognize a person. Moreover, in situations where a system is implemented to recognize faces in the wild (e.g., on public streets, in public transportation), persons may be constantly moving, making it difficult to obtain a static image of a person that is useable to accurately identify a person in an image.

BRIEF SUMMARY

Briefly stated, embodiments are directed toward determining a set of candidate identities of a person associated with a face in video based on a correspondence between a biometric motion signature and one or more biometric signatures stored in data storage. Motion information of the face in the video is obtained and provided to a motion neural network. The motion information of the face may indicate motion of the face in two or more directions. The motion neural network generates the biometric motion signature based on the motion information provided. The biometric motion signature is compared with a plurality of biometric motion signatures stored in the aforementioned data storage. The set of candidate identities are determined as a result of the correspondence between the biometric motion signature and the one or more biometric signatures of the plurality of biometric signatures. The set of candidate identities may be determined as a result of the one or more biometric motion signatures satisfying a similarity criterion with respect to the biometric motion signature. An identity of the person depicted in the video may be authenticated as a result of determining the set of candidate identities.

The motion neural network is trained to generate biometric motion signatures of faces using training data that includes motion information of face pixels of a plurality of faces in video data. The motion neural network being trained provides biometric motion signatures for the training data provided. The motion neural network may be provided with face pixel information that corresponds to defined face points in each face. Parameters of the motion neural network are adjusted based on the biometric motion signatures received.

In some embodiments, the set of candidates may be determined in connection with obtaining a biometric pixel signature of the face in the video. Pixel information of the face in the video may be provided to a pixel neural network. The pixel neural network generates the biometric pixel signature based on the pixel information provided. The identity of the person depicted in the video may be authenticated based on both the biometric pixel signature and the biometric motion signature. In some embodiments, the biometric pixel signature may be compared with stored biometric signatures that correspond to the set of candidate identities determined based on the biometric motion signature correspondence.

Determining the set of candidate identities using the biometric motion signature may facilitate improved confidence in authentication of a subject's identity. Using the biometric motion signature in connection with the biometric pixel signature may help to improve the efficiency of facial recognition technologies by, for example, reducing the time and computational resources associated with determining identities. The technologies disclosed herein may also improve user experience and improve robustness of a system by using video data as an authentication factor.

DETAILED DESCRIPTION

Figure 1:
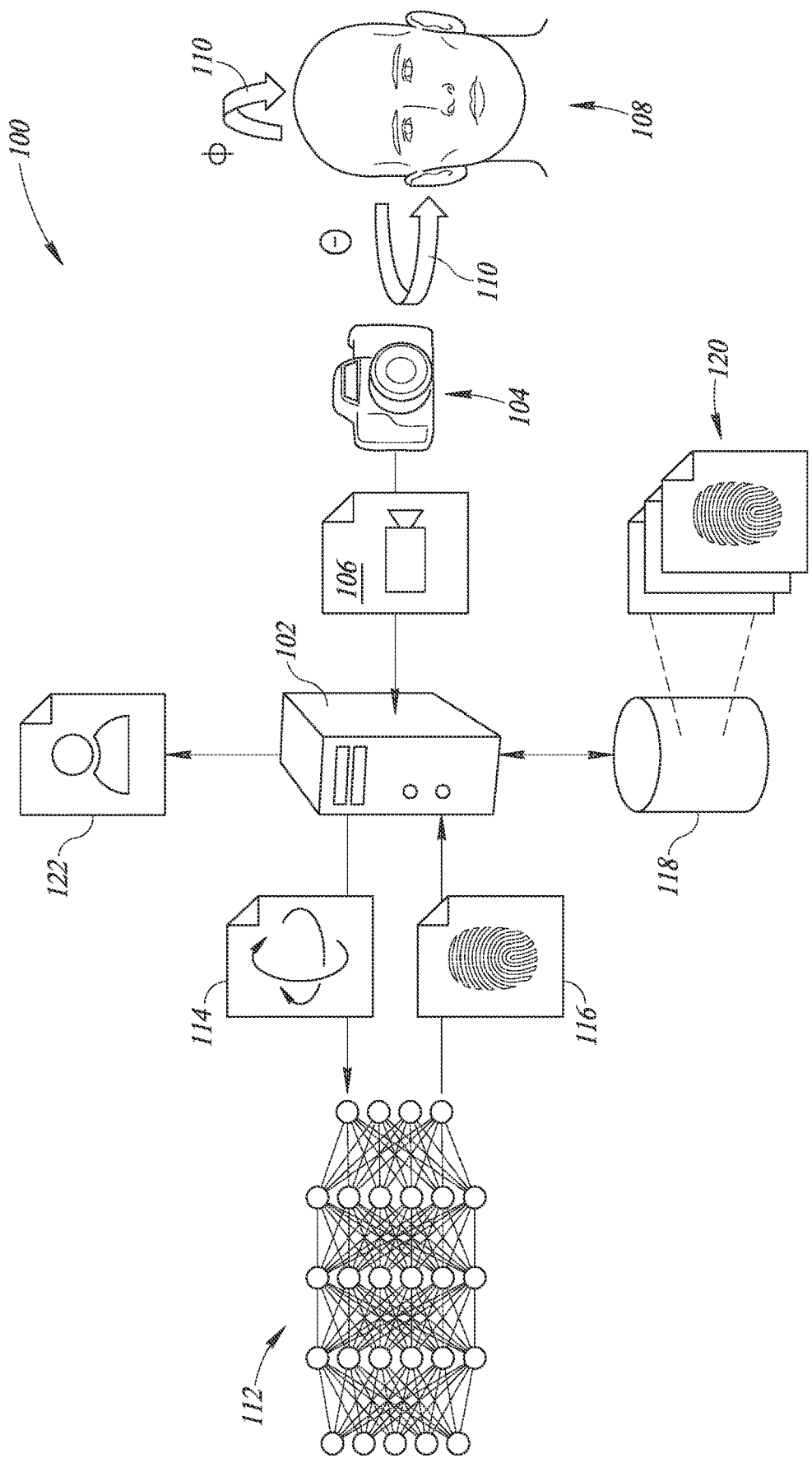
FIG. 1 shows an environment in which a system determines a set of candidate identities of a person using motion information.

Technologies are disclosed herein for determining a set of candidate identities of a person in video data based on a biometric motion signature corresponding to motion of a face of the person in the video data. Motion information is obtained corresponding to motion of the face in the video data. The motion information is provided as input to a neural network and the neural network generates the biometric motion signature in response. The biometric motion signature is compared with a plurality of biometric signatures stored in data storage. The candidate identity of the person is determined as a result of a correspondence between the biometric motion signature and a stored biometric signature of the plurality of biometric signatures.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances. Moreover, the term "subset," as used herein, refers to a collection of one or more members or instances that are collectively smaller in number than the set or plurality of which the subset is comprised. For instance, a subset of a set of ten items will include less than ten items and at least one item.

FIG. 1 shows a system 100 in which a set of candidate identities are determined using motion information regarding movement of a face according to one or more embodiments. The system 100 includes a computer system 102 electrically communicatively coupled to a camera 104 that generates an image signal imaging of a subject 108 over a period of time. The image signal may be processed, e.g., by signal processing circuitry of the camera 104, to generate video data 106 that includes a sequence of images depicting movement of a face of the subject 108 in one or more directions 110. In some embodiments, the video data 106 may have a compressed format (e.g., H.264, MPEG-4 Part 2) and have associated therewith motion vector information that indicate movement of objects represented by blocks for successive frames of the sequence of images. The video data 106 may be received as a stream over time or as a discrete collection of data, such as a computer file. In some embodiments, the stream of video data 106 may be streamed in real-time as it is produced by a camera or system. In some embodiments, the stream of video data 106 may be a stream of previously stored data.

The system 100 also includes a neural network 112 that is trained to generate a unique biometric signature of the subject 108 based on the movement of the subject 108 in the one or more directions 110. In particular, the neural network 112 receives motion information 114 regarding motion of face pixels in the video data 106 that represent movement of a face of the subject 108 over a period of time. In response, the neural network 112 generates a biometric motion signature 116 based on the motion information 114. The biometric motion signature 116 is a biometrically invariant signature particular to the face of the subject 108 signifying how facial features of the subject 108 move in the one or more directions 110.

The biometric motion signature 116 is used to determine a set of candidate identities of the subject 108. The system 100 may include data storage 118 comprising memory (e.g., read-only memory, random access memory) that stores a plurality of biometric motion signatures 120 generated by the neural network 112 based on image information regarding of a plurality of subjects, which may include a biometric motion signature of the subject 108. The stored biometric signatures 120, for individual subjects, may include a stored signature generated based on pixel data of static images of the face of the subject and may include a stored signature generated based on motion data associated with a sequence of moving images of the face of the subject. The stored biometric signatures 120 may be an organized collection of data stored in the data storage 118 according to a database model facilitating storage, retrieval, updating, and/or querying of the stored biometric signatures 120 and associated information, such as information identifying a person associated with the particular biometric signature or a pixel biometric signature of the associated person. The biometric motion signature 116 may be compared with a set of the stored biometric signatures 120 to determine whether the biometric motion signature 116 satisfies a criterion for similarity therebetween.

The computer system 102 may generate identification information 122 representing a set of candidate identities of persons associated with one of the stored biometric signatures 120 for which the biometric motion signature 116 satisfies the criterion for similarity. The identification information 122 may include a record, such as a confidence score, indicating a degree of similarity of the corresponding stored biometric signature to the biometric motion signature 116. In some embodiments, the identification information 122 may be used in successive steps to identify the subject 108. In some embodiments, a process may be implemented in the system 100 to improve a confidence of positive identification in parallel with the analysis using the biometric motion signature 116.

The computer system 102 includes one or more processors and memory storing a set of instructions that, as a result of execution by the one or more processors, cause the computer system 102 to perform as described herein. The memory of the computer system 102 may include volatile memory (e.g., random-access memory) and/or non-volatile memory (e.g., read-only memory) for storing data and instructions. In some embodiments, the one or more processors of the computer system 102 may include a device having hardware specifically configured to perform at least some of the operations described herein. For instance, the one or more processors may include microcontrollers (MCU), application specific integrated circuits (ASICs), field programmable gate arrays (FPGAs), system-on-a-chip (SoC), or other specialized or customizable computing hardware hardwired to perform at least some of the operations described herein. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to perform operations described herein.

The camera 104 may be part of the system 100 or may be considered to be a component separate from the system 100. The camera 104 is electrically communicatively coupled to the computer system 102 and provides the video data 106 as an input to the system 100. The camera 104 may be directly coupled to the system 100 via a wired connection or may be remotely coupled to provide the video data 106 to the computer system 102, for example, over a wired or wireless communication network. In some embodiments, a plurality of cameras 104 may be coupled to the system 100 that each provide video data 106 to the system 100. Although the video data 106 is shown as being received from the camera 104, the video data 106 may be received from a source other than the camera 104. For instance, the video data 106 may be received over a network (e.g., local area network, wide area network) and/or via an intermediate device, such as a network router or a server. In some instances, the video data 106 may be stored in memory at a first time and provided to the computer system 102 at a second time later than the first time.

The neural network 112 is an artificial intelligence structure that includes a set of nodes (artificial neurons, perceptrons) connected by edges (artificial synapses). The neural network 112 may be organized in a plurality of layers comprising an input layer, a set of hidden layers, and an output layer. The neural network 112 may be generated according to one or more neural network models and principles in which multilayered neural networks learn to generate templates and/or biometric motion signatures based on stored data regarding movement of a face. The neural network 112 may by a recursive or a recurrent neural network in which nodes or layers of the network apply weights are applied recursively or repeatedly applied to inputs. The neural network 112 may be a convolutional neural network in which an input is convolved with a kernel and the output thereof is provided to a subsequent layer. The neural network 112 may be a deep neural network having a hierarchical structure in which each node, for example, performs multiply-accumulate operations on input data.

The neural network 112 is trained to generate biometric motion signatures that correspond to movement of a face in a video. The neural network 112 is trained according to artificial neural network principles by, for example, providing sets of training data to a neural network model comprising the set of connected nodes and adjusting parameters of the neural network 112 to generate the biometric motion signature 116 given the motion information 114 as input. As one example, the neural network 112 may be generated or trained via supervised or unsupervised learning principles involving, e.g., back propagation algorithms, gradient descent algorithms, and/or Levenberg-Marquardt algorithms to generate the biometric motion signature 116 based on training data that includes motion information and corresponding movement of a face. Although the neural network 112 is shown as being separate from the computer system 102, the neural network 112 may operate as part of the computer system 102 in some embodiments. In some embodiments, the neural network 112 may operate on a processor-based computer system separate from the computer system 102.

In some embodiments, the camera 104 may include one or more processors configured to implement the neural network 112. For example, a processor of the camera 104 may be coupled to an imaging sensor (e.g., complementary metal-oxide-semiconductor (CMOS) sensor, charge-coupled device (CCD) sensor) and receive an electronic signal therefrom representative of light incident upon the sensor. The processor may implement the neural network 112 to generate one or more biometric signatures based on electronic signals received, such as the biometric motion signature 116 or the biometric pixel signature discussed herein.

The biometric motion signature 116 may be encoded as a set of alphanumeric values corresponding to movement of certain face features in the video data 106. The set of alphanumeric values may be a vector or template organized as a matrix or an array of alphanumeric values in some embodiments. However, the configuration (e.g., size, shape) and association of values with corresponding facial feature movements may be determined by the neural network 112 as a result of the training procedure. In some embodiments, the neural network 112 may be trainable and trained to determine a set of candidate identities for the subject 108 by comparing the biometric motion signature 116 with the stored biometric motion signatures 120. In some embodiments, face pixel information or information representative of a facial structure of the subject 108 may be provided during or in connection with training as a ground truth to facilitate accuracy of the biometric motion signature 116 generated.

Figure 2:
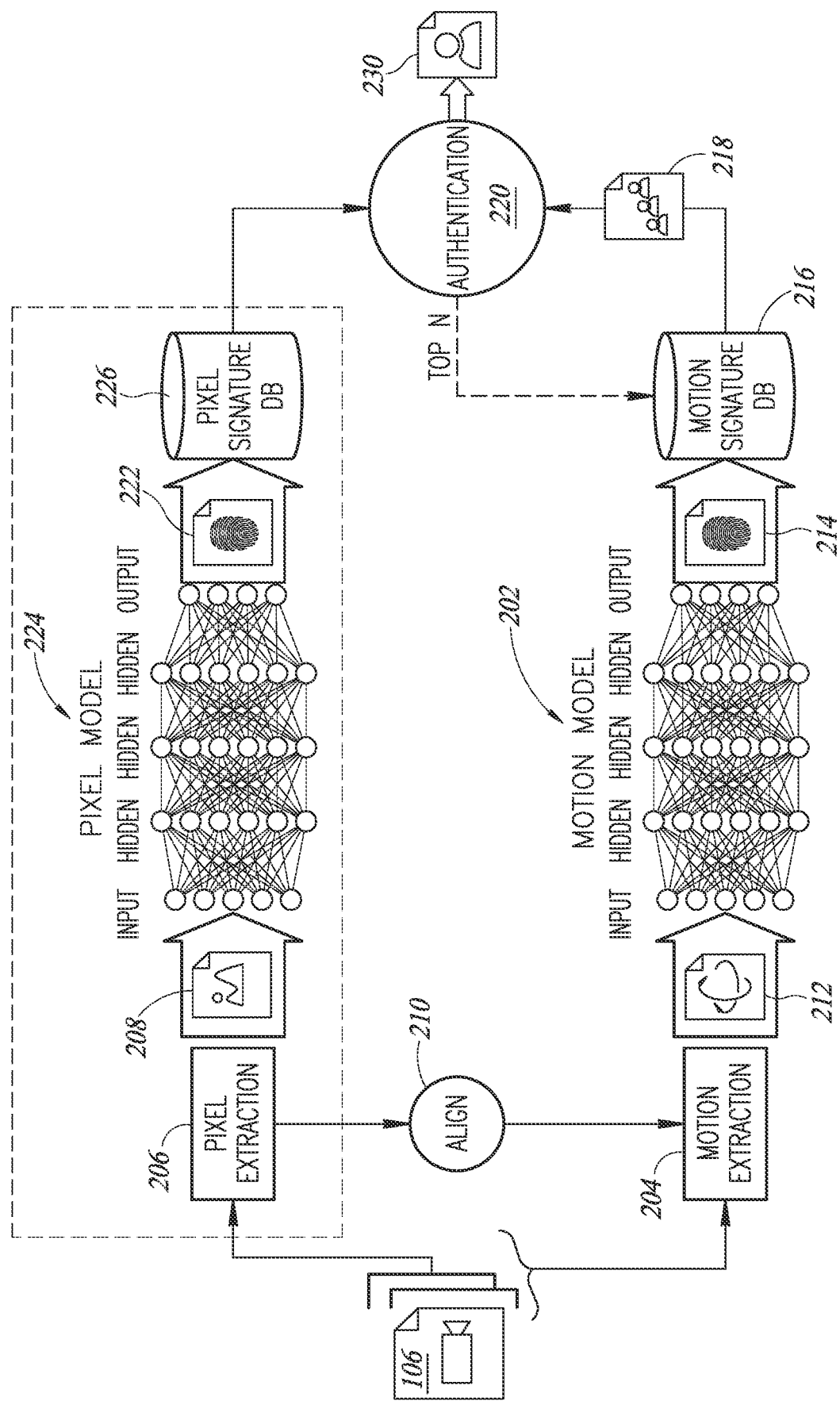
FIG. 2 shows a diagram in which the system of FIG. 1 determines the set of candidate identities using a motion neural network.

FIG. 2 shows a diagram 200 in which the system 100 determines a set of candidate identities using a motion neural network 202 according to one or more embodiments. In the diagram 200, the computer system 102 extracts various information based on the video data 106 generated by the camera 104. The video data 106 includes a sequence of images depicting movement of a face of the subject 108, as described herein. The computer system 102 performs a motion extraction procedure 204 in which the motion information 114 is extracted from or generated using the video data 106.

The motion information 114 indicates how features in the video data 106 move during a sequence of frames. For instance, the motion information 114 may include, for a provided frame of the video data 106, a plurality of blocks or areas and motion vectors associated with at least some of the blocks that indicate motion of pixels in one or more frames proximate to the provided frame (e.g., an adjacent frame, a frame within three frames of the provided frame, a frame within five frames of the provided frame). The motion information 114 may include information regarding motion in different directions—for instance, the motion information 114 may include a set of motion information regarding motion in a first direction (e.g., horizontal direction), a set of motion information regarding motion in a second direction (e.g., vertical direction), and/or a set of motion information regarding motion in a third direction (e.g., diagonal direction, rotational direction about an axis). Motion vectors may include a set of affine transformations that may describe the motion scaling of the block or macroblock. The set of affine transformations may be organized as a matrix or array of transformations.

In the motion extraction procedure 204, the computer system 102 may determine whether the video data 106 includes motion information, such as encoded information predicting movement of pixels in the video data 106. If the video data 106 includes the motion information 114, the computer system 102 may extract the motion information 114 therefrom. In some embodiments, the computer system 102 may generate the motion information 114 based on differences between image frames of the video data 106.

In connection with the motion extraction procedure 204, the computer system 102 may perform a pixel extraction procedure 206 in which the computer system 102 extracts face pixel information 208 corresponding to the face of the subject 108. The computer system 102 may implement facial recognition techniques to identify pixels in frames of the video data 106 that capture a face image of a person. The computer system 102 may obtain face pixel information 208 for the identified face pixels that includes one or more types of information for the identified pixels, such as location information, color information, and/or luminance information.

The computer system 102 may also perform an alignment procedure 210 in which face pixels are correlated with corresponding motion of the video data 106. In the alignment procedure 210, the computer system 102 may perform a temporal alignment in which portions of the face pixel information 208 are associated with corresponding portions of the face motion information 212. As a non-limiting example, a macroblock of the face motion information 212 that encodes motion for an image frame of the face pixel information 208 may be associated with a corresponding image frame that corresponds in time to the macroblock. The alignment procedure 210, in some embodiments, may include a spatial alignment in which pixels of the face pixel information 208 are mapped as corresponding to corresponding portions of the face motion information 212. The spatial alignment may include correlating a set of face pixels for a defined face point (e.g., nose tip, iris center, chin) with corresponding motion information that encodes motion for the set of face pixels.

In the motion extraction procedure 204, the computer system 102 may extract portions of the motion information 114 that are associated with corresponding portions of the face pixel information 208. The motion extraction procedure 204 may be performed subsequent to or in connection with the alignment procedure 210. The computer system 102 may identify a defined set of points or areas of a face in the face pixel information 208 and identify a corresponding portion of the motion information 114. For instance, the computer system 102 may identify a set of pixels in the face pixel information 208 that correspond to a defined portion of a face, such as a tip of the nose or the chin. The computer system 102 may be configured to identify a plurality of defined portions of the face of the subject 108 each of which may have a different motion profile based on a structure of the face.

The computer system 102 may then determine corresponding portions of the motion information 114 that encode motion for the face portions identified. This mapping between the face pixel information 208 and the motion information 114 may be performed for every defined face point of the face. The computer system 102 may then extract relevant portions of the motion information 114 as face motion information 212. The computer system 102 may then provide the face motion information 212 to the motion neural network 202 for generating the biometric motion signature 116.

The motion neural network 202 generates a biometric motion signature 214 based on the face motion information 212 received. The biometric motion signature 214 is a digital pattern representative of motion of a particular set of facial features of a face of the subject 108 in the video data 106. The biometric motion signature 214 is useable to identify a person corresponding to the face depicted in the video data 106. To generate the biometric motion signature 215, the motion neural network 202 may be trained in some embodiments by receiving motion information of movement of faces of subjects and corresponding biometric signatures generated using the motion information. In some embodiments, to generate the biometric motion signature 215, the motion neural network 202 may be trained by receiving motion information of movement of faces of subjects and corresponding biometric signatures generated using pixel information for the face of the subjects. Further description regarding training the motion neural network 202 is provided elsewhere herein.

The biometric motion signature 214 is compared with biometric signatures stored in a motion signature database 216 to determine a set of candidate identities of the subject 108. The comparison of the biometric motion signature 214 with the stored biometric signatures is performed by the computer system 102 in some embodiments. For each comparison, the computer system 102 may obtain a stored biometric signature from the motion signature database 216 and determine whether the stored biometric signature is a match with the biometric motion signature 214. A determination that the biometric motion signature 214 is a match for the stored biometric signature may involve a determination that the biometric motion signature 214 satisfies a similarity criterion with respect to the stored biometric signature. Similarity may be determined on the basis of proximity of alphanumeric values encoded in the biometric motion signature 214 to corresponding alphanumeric values encoded in the stored biometric motion signature. The similarity criterion may specify that the biometric motion signatures being compared meet or exceed a threshold of similarity—for example, that there is at least a 95% match between the biometric motion signatures.

The computer system 102 may authenticate the subject 108 associated with the biometric motion signature 214 based on a result of the comparison. If the biometric motion signature 214 is not a match for the stored biometric signature, the computer system 102 may perform additional signature comparisons with remaining stored biometric signatures and generate a record of candidate identities 218 that satisfy the similarity criterion. In some embodiments, the motion neural network 202 may be trained to perform the comparison between the biometric motion signature 214 and the stored biometric signatures in the motion signature database 216 and determine the set of candidate identities 218.

The biometric motion signature 214 is pattern of values that represent movement characteristics of the face of the subject 108. For example, the biometric motion signature 214 may be a motion-based vector or template that may be encoded as an array of alphanumeric values. The biometric motion signature 214 is considered as being distinct from a biometric signature generated using the face pixel information 208 of the subject 108. In particular, the size of the motion information 212 may be smaller than the face pixel information 208. The motion information 212 may include information for a set of blocks (e.g., a 16×16 array of blocks, 8×8 array of blocks) for a set of frames, wherein the blocks have information representing motion of pixels in the block associated therewith. By contrast, the face pixel information 208 may include information for each pixel, such as luminance and color content, which can make the face pixel information 208 much larger in size than the motion information 212. Due to the relatively reduced size, evaluation of the biometric motion signature 214 in such embodiments may be faster and less resource intensive than evaluation using a biometric signature generated using the face pixel information 208.

Comparison between the biometric motion signature 214 and the stored biometric signatures in the motion signature database 216, in some embodiments, involves a piecewise comparison between corresponding portions of the signatures. In some embodiments, the comparison may involve generating hash values for the signatures using a hash function and comparing the results. For instance, a hash value of the biometric motion signature 214 and a hash value of a stored biometric signature may be generated using a hash function. Then, a rolling hash algorithm or a fuzzy hash algorithm may be implemented to determine a similarity score between the hash values. If the similarity score satisfies a similarity criterion (e.g., similarity score is greater than a certain percentage), an identifier associated with the stored biometric signature may be recorded as a candidate identity. The identifier may be a unique identifier corresponding to a subject, such as an employee identification number, name, known traveler number, social security number, or other similar identifier. In situations in which a previously-generated identity is not stored in the motion signature database 216, a new unique identifier may be generated for the subject 108 and stored in the motion signature database 216. In some embodiments, the computer system 102 may cause a face image to be stored in association with the new unique identifier, or may cause a sequence of face images or information describing motion of the face to be stored in association with the new unique identifier. In some embodiments, the motion neural network 202 may be trained to determine candidate identities using machine learning algorithms, such as support-vector machine classification or clustering algorithms. The motion neural network 202 may be a deep neural network, a convolutional neural network, or a recursive of recurring neural network.

In some embodiments, similarity between the biometric motion signature 214 and the stored biometric signature may be based on distances in Euclidean space between the signatures. For example, Euclidean distances between the signatures may be determined based on the sum of squared distances between corresponding features in the respective signatures. A match may be determined based on a similarity or proximity in Euclidean space between the signatures. The match may be determined between the signatures based on whether the distances satisfy a similarity criterion for Euclidean distances.

Upon determining the set of candidate identities, the computer system 102 may perform an authentication procedure 220 to authenticate or verify the subject 108. The authentication procedure 220, in some embodiments, may involve determining an identity of the subject 108. In some embodiments, the authentication procedure 220 may involve verifying liveness of the subject 108—that is, determining that the subject 108 is actually present in front of the camera 104. The authentication procedure 220 may consider a result of the biometric motion signature comparison as a supplemental factor for authenticating the subject 108 in connection with verification of another biometric signature, such as a fingerprint or voice signature.

Determining the set of candidate identities 218, as described herein, may be performed in connection with evaluation of a biometric pixel signature 222 to authenticate the subject 108. In some embodiments, determining the set of candidate identities 218 may be performed as a coarse filter to eliminate the identities of persons having stored biometric motion signatures that do not satisfy a similarity criterion with respect to the biometric motion signature 214. The face pixel information 208 may be generated or extracted as a result of the pixel extraction procedure 206 described herein. The face pixel information 208 may be provided to a pixel neural network 224, which generates the biometric pixel signature 222 based on the face pixel information 208.

The biometric pixel signature 222 may be a pixel-based template generated based on facial features of the subject 108. For instance, the biometric pixel signature 222 may comprise a set of vectors or values that correspond to features of the face of the subject 108. The pixel neural network 224 may be trained to generate the biometric pixel signatures 222 by providing a set of face images of known persons and generating values corresponding to a set of facial features for the subject. Methods involving Gabor Filters, Fuzzy Neural Networks, and Hidden Markov Models may be implemented by the pixel neural network 224 to generate the biometric pixel signature 222. In some embodiments, the motion neural network 202 and the pixel neural network 224 may be combined as a single neural network that generates the biometric motion signature 214 and the biometric pixel signature 222 as separate signatures.

The motion neural network 202 is less complex and smaller than the pixel neural network 224 and thus may utilize fewer computational resources and take less time to generate the biometric motion signature 114 relative to the resources and time taken by the pixel neural network 224. The face motion information 212 provided as input has significantly fewer inputs than the face pixel information 208. Thus, the number of input layers and the complexity of the hidden layers of the motion neural network 202 for processing the face motion information 212 is less than the layers of the pixel neural network 224. The motion neural network 202 may receive significantly less training than the pixel neural network 224 to be appropriately trained to generate a biometric signature. According to some models, the complexity of the motion neural network 202 may therefore be 10-25% of the complexity of the pixel neural network 224.

The computer system 102 may return an output 230 based on a result of the authentication procedure 220. The output 230 may include identification information of the subject 108, such as a name, unique alphanumeric identifier (e.g., employee number, known traveler number), or other information identifying an instance in which the subject 108 was previously encountered (e.g., date, time, and location where the subject 108 was photographed).

In the authentication procedure 220, the biometric pixel signature 222 may be compared with stored biometric pixel signatures in pixel signature database 226 to determine the identifying information for the subject 108. The set of candidate identities 218 may be used along with the biometric pixel signature 222 to reduce the number of comparisons to be performed to determine the identity of the subject 108. For instance, the computer system 102 or pixel neural network 224 may compare the biometric pixel signature 222 with stored biometric signatures corresponding to the set of candidate identities 218 and omitting comparison with other stored biometric signatures. This may reduce the amount of time taken and processing resources occupied to determine identifying information for the subject 108.

In some embodiments, determining a match of the biometric pixel signature 222 to a stored biometric signature may be performed in connection with determining the set of candidate identities 218 to improve the confidence of a match. The biometric pixel signature 222 may be compared with stored biometric signatures in the pixel signature database 226 to determine the identifying information for the subject 108. The set of candidates 218 may then be evaluated to determine that the identifying information corresponds to a candidate identity of the set of candidate identities 218.

In some embodiments, the set of candidate identities 218 may include, for each candidate identity, a similarity score indicating a similarity between the biometric motion signature 214 and the stored biometric signature satisfying the similarity criterion. If the candidate identity for which the identifying information corresponds does not have the highest or one of the highest (e.g., top five, top three) similarity scores among the set of candidate identities 218, the output 230 may include an indication that a relatively lower confidence for the biometric pixel signature 222 match. In the case that there is a match for the biometric pixel signature 222 but a candidate identity could not be determined using the biometric motion signature 214, the computer system 102 may determine that the video data 106 of the subject 108 fails a liveness detection. That is, the computer 102 may determine that the subject 108 is not actually physically present before the camera 104 and fail to authenticate the subject 108 as a result.

In some embodiments, the biometric motion signature 214 may be used to as a second factor to authenticate the subject 108. The biometric pixel signature 222 may be generated for the subject based on the video data 106 and a candidate identity may be determined based on a comparison between the biometric pixel signature 222 and a plurality of stored biometric pixel signatures in the pixel signature database 226. To verify the candidate identity, a search or query may be performed to determine whether a biometric motion signature associated with the candidate identity is stored in motion signature database 216. If so, the biometric motion signature 214 is generated using face motion information 212 obtained from the video data 106. The biometric motion signature 214 may be compared with the stored biometric motion signature associated with the candidate identity.

A similarity score may be generated based on a result of the comparison that indicates a degree of similarity between the biometric motion signature 214 and the stored biometric motion signature. The subject 108 may be authenticated as a result of the similarity score satisfying a defined similarity condition—for example, if the similarity score exceeds a 95% match between the biometric motion signatures. The authenticity of the subject 108 may be rejected or declined if the similarity score fails to satisfy the defined similarity condition.

In some instances, the biometric motion signature 214 may be used as a supplemental authentication factor in connection with a biometric signature other than the biometric pixel signature 222. Verification of the biometric motion signature 214 with a stored biometric motion signature may be used in connection with verification of a biometric voice signature of the subject 108, verification of a fingerprint of the subject 108, or verification of a token. Verification of the biometric motion signature 214 as a supplemental authentication factor may be as a result of a failure to authenticate a subject based on a primary verification factor.

Figure 3A:
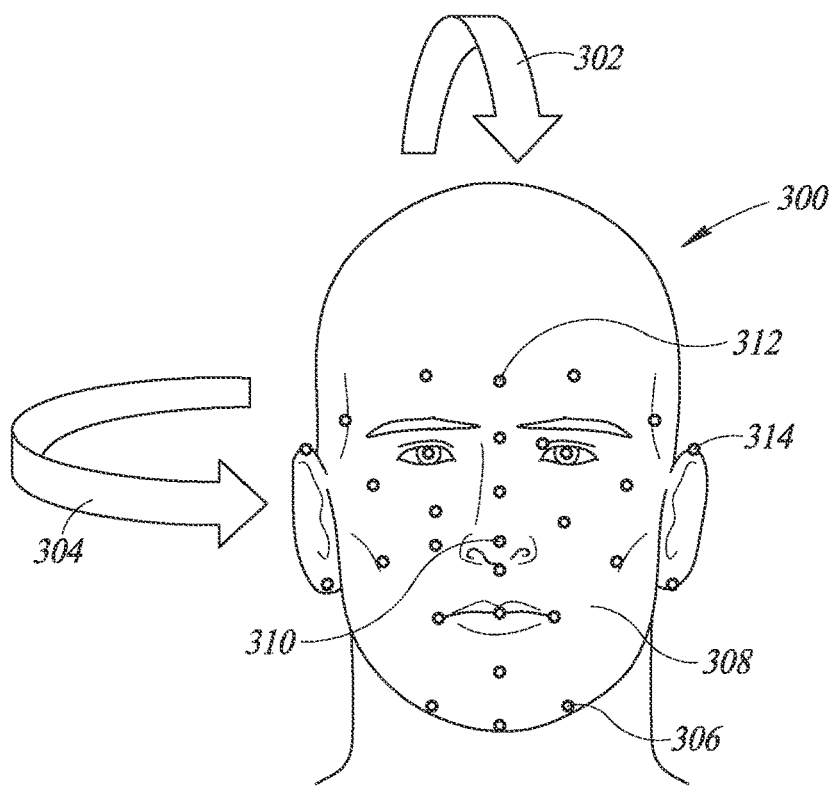
FIG. 3A shows a front view of a head of a subject and a plurality of defined face points in a face of the subject.
Figure 3B:
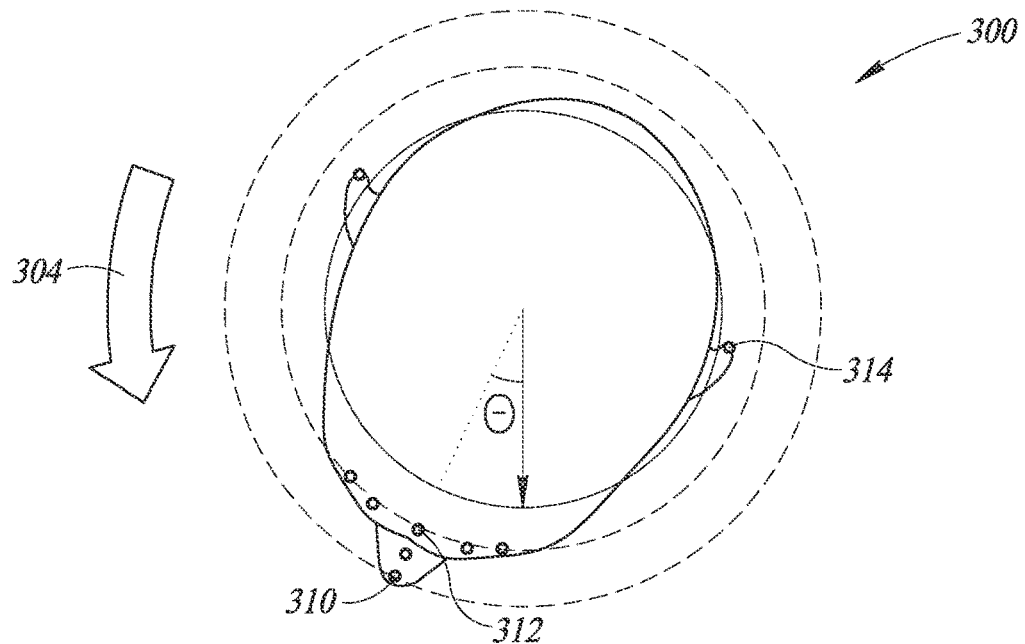
FIG. 3B shows an overhead view of the head of the subject of FIG. 3A.

FIG. 3A shows a front view of a head 300 of the subject 108 over a time period in which the video data 106 is captured by the camera 104 according to one or more embodiments. FIG. 3B shows an overhead view of the head 300 over the aforementioned time period of FIG. 3A. During the time period, the camera 104 captures movement of the head 300 in one or more directions. The camera 104 may capture movement in a first direction 302 (e.g., pitch direction, vertical direction) and/or may capture movement in a second direction 304 (e.g., yaw direction, horizontal direction). The motion extraction procedure 204 involves identifying, in the video data 106, a set of points 306 that correspond to particular portions of a face 308 or the head 300 of the subject. For example, the computer system 102 may identify a first point 310 that corresponds to a tip of the nose, a second point 312 that corresponds to a forehead center, and a third point 314 that corresponds to a helix of an ear. There are a defined number of points and locations of points of the face 308 that the computer system 102 is configured to identify in one or more image frames of the video data 106.

Referring to FIG. 3B, it can be seen that certain points of the head 300 move at different rates than other points. When the head 300 is rotated in the second direction 304 by an amount θ over a time period, the first point 310 moves at a first linear velocity (or tangential velocity), the second point 312 moves at a second linear velocity, and the third point 314 moves at a third linear velocity. Specifically, when the head 300 is rotated in the second direction 304 by an amount θ over a time period the first point 310 has a larger linear velocity than the second point 312, which has a larger linear velocity than the third point 314. As a result of training, the motion neural network 202 may generate a biometric motion signature 214 that corresponds to motion of the head 300 based on how the set of points 306 move during the time period during which the video data 106 is captured by the camera 104.

Figure 4:
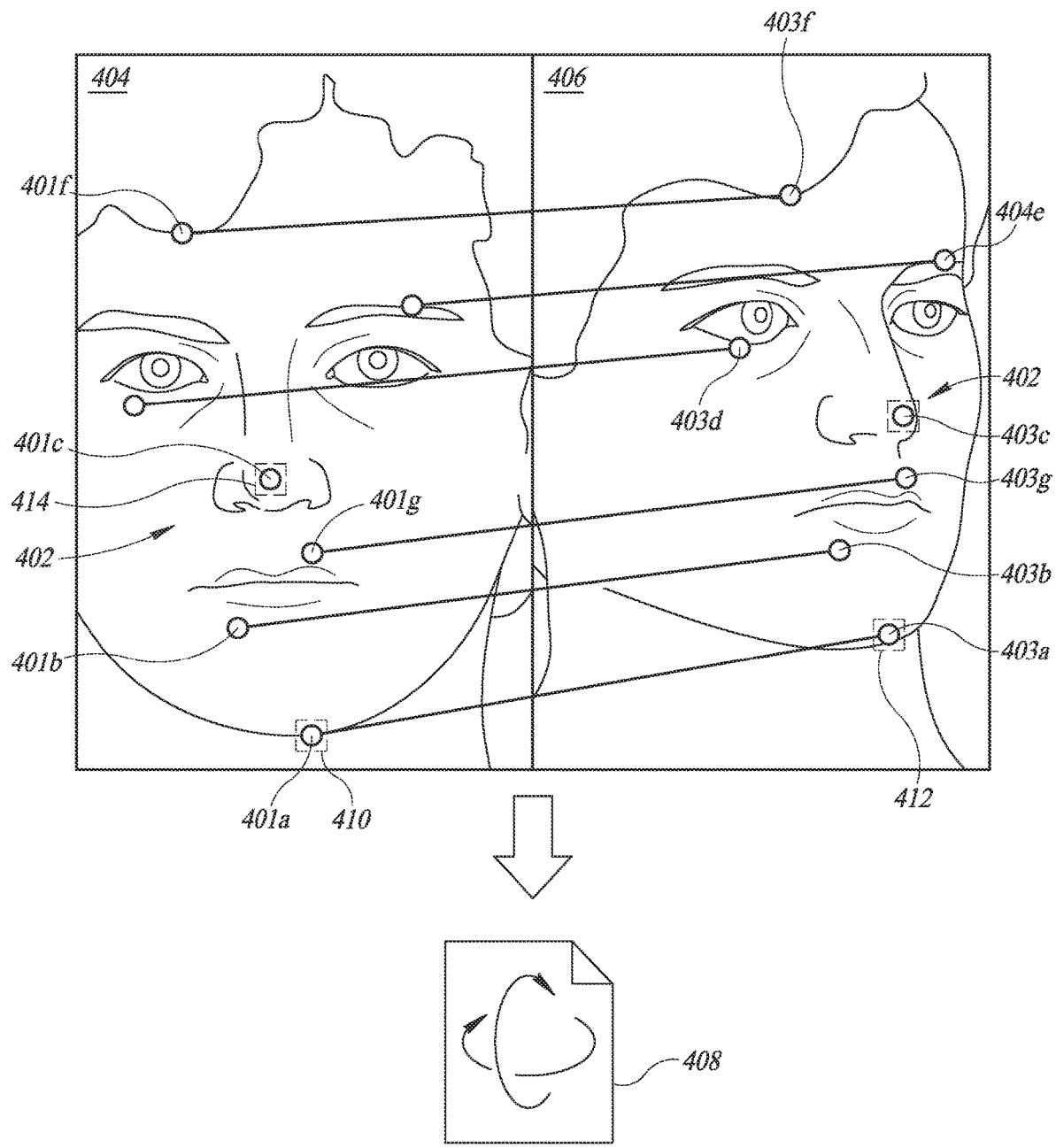
FIG. 4 shows motion information that corresponds to motion of the plurality of defined face points as generated by the system of FIG. 1.

FIG. 4 shows a diagram 400 in which face motion information is generated or extracted based on the video data 106 captured by the camera 104 in FIG. 1. The computer system 102 may identify a set of defined points 401 of a face 402 in a first frame 404 of the video data and a corresponding set of points 403 of the face 402 in a second frame 406 of the video data. The computer system 102 or the motion neural network 202 may extract face motion information 408 from the video data 106 for the set of points identified in at least a subset of image frames of the video data 106. The motion vectors in video data may encode vectors between sequential image frames or non-sequential image frames. As one example, H.264 video data encodes motion vectors for a plurality of blocks in image frames of the video data. Other video encoding methods may be implemented without departing from the scope of the present disclosure. Non-limiting examples of other video encoding methods include RealMedia™ High Definition (RMHD), Advanced Video Coding High Definition (AVCHD), H.265/MPEG-H High Efficiency Video Coding, and AOMedia Video 1. For the first frame 404, the system identifies a first block 410 containing a first defined point 401a of the set of points 401 and extracts motion information associated with the first block 410 from the video data 106. For the second frame 406, the system identifies a second block 412 containing the first point 403a of the set of points 403 and extracts motion information associated with the second block 412. The system may proceed to extract motion information from the video data 106 for at least some of the defined points 401 and 403 of the face 402 for each frame having the motion information associated therewith.

In some instances, the video data 106 may not include motion information—for instance, the video data 106 may be uncompressed video data. In such situations, the motion information 408 may be generated based on pixel data in the video data 106. The computer system 102 may identify the first set of points 401 in the first frame 404 of the video data 106 that correspond to the defined set of points of the face 402 of the subject 108. The computer system 102 may identify the second set of points 403 in the second frame 406 of the video data 106 that correspond to the defined set of points of the face 402. In one embodiment, the number of defined set of points of the face 402 was selected as 72; however, the number and location of the defined set of points may be adjusted to achieve a desired accuracy.

Thereafter, the computer system 102 may determine the motion information 408 based on differences in position between the corresponding points of the first set of points 401 and the second set of points 403 in view of a time difference between the first frame 404 and the second frame 406. As an example, to determine horizontal motion of the defined point of the face 402 corresponding to the point 401a and the point 403a, the computer system 102 may determine a horizontal position of the point 401a in the first frame 404 and a horizontal position of the point 403a in the second frame 406. The horizontal motion of the defined point may then be calculated as the difference between the positions divided by a difference in time between the first frame 404 and the second frame 406, such as a difference between timestamps associated with the respective frames. In some embodiments, the motion neural network 202 may be trained to determine the motion information 408 as part of generating the biometric motion signature 214 (FIG. 2).

Figure 5:
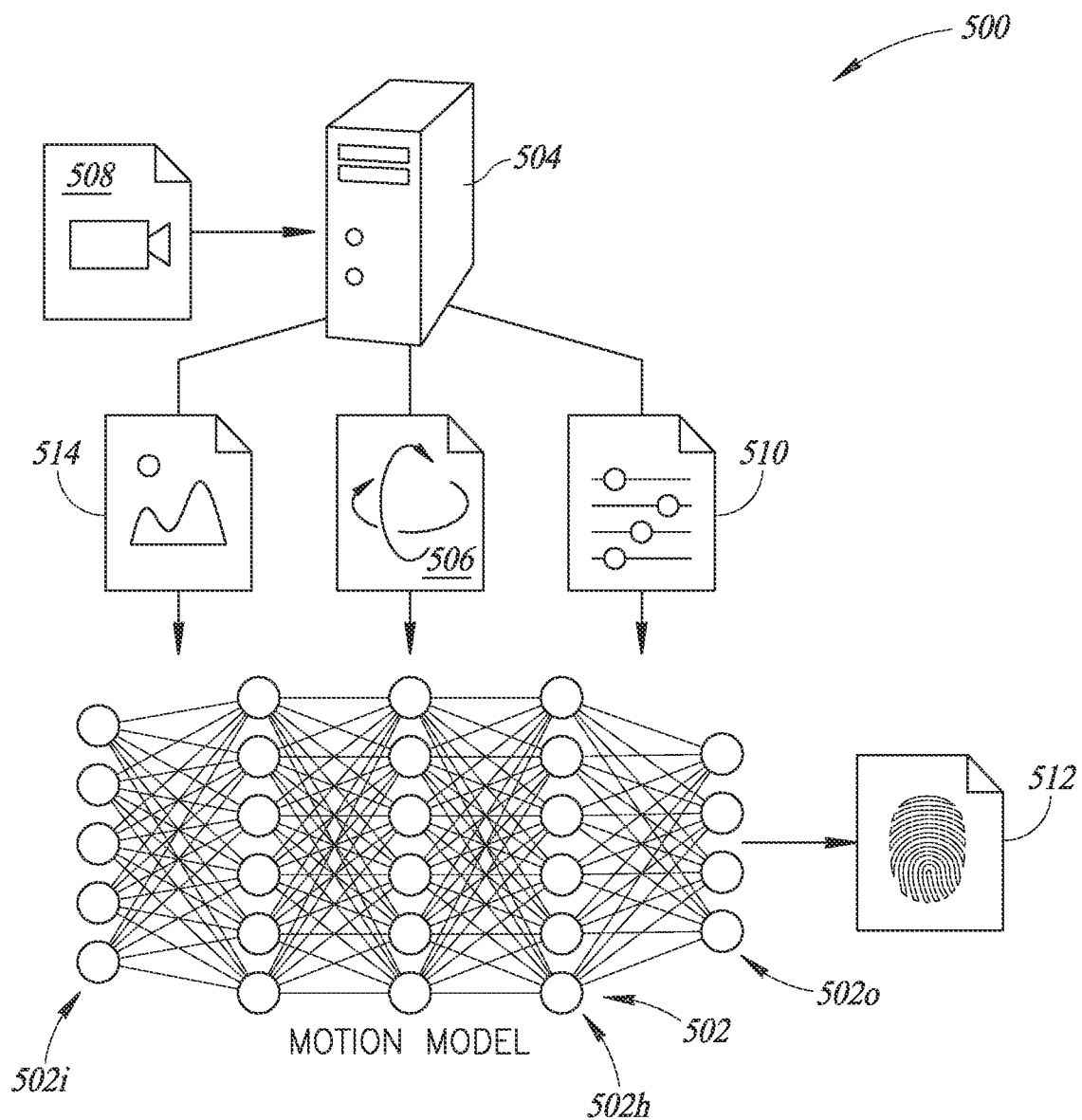
FIG. 5 shows a diagram for training a motion neural network of the system of FIG. 1.

FIG. 5 shows a diagram 500 in which a motion neural network 502 is trained to generate a biometric motion signature that is invariant to movement of a particular face according to one or more embodiments. Training the motion neural network 502 may be performed by a computer system 504 operated or programmed by one or more users. The computer system 504 may generate training data 506 using video data 508 capturing face motion of one or more subjects. The training data 506 may depict movement of faces in two or more directions, such as a vertical direction and a horizontal direction. The motion neural network 502 is an artificial neural network, such as a convolutional neural network or a deep neural network that comprises at least one input layer 502i, a set of hidden layers 502h, and at least one output layer 502o, each of which comprises a plurality of connected nodes.

The video data 508 includes video showing faces of a plurality of subjects each moving in one or more directions relative to the camera(s) capturing video of the faces. The video data 508 may include a plurality of video sequences of a face of the same person moving in different directions, at different rates, etc. The training data 506, in some embodiments, includes motion information indicating the motion of the defined set of points of the face in the video data 508. The training data 506 should be of sufficient size to train the motion neural network 502 to achieve a desired degree of accuracy or error rate.

The computer system 504 may also provide or adjust parameters 510 of the motion neural network 502. The parameters 510 may include a dimensionality of a biometric motion signature 512 to be generated. For instance, the dimensionality may be the number of values in the biometric motion signature 512, which may correspond to the number of defined points in the face. The dimensionality of the biometric motion signature 512 may be selected based on the processing power of the intended device to run the motion neural network 502 as well as a desired error rate or accuracy.

The motion neural network 502 may be trained by initially setting the parameters 510 of the motion neural network 502, such as neural network kernels, and weight vectors and/or biases of the nodes, to initial parameter values. The motion neural network 502 is provided a portion of the training data 506 and one or more biometric motion signatures 512 are generated. A loss or error may be determined for the biometric signatures 512 and the motion neural network 502 is trained by, for instance, back propagating the loss or error with respect to the parameters 510, and updating the parameters 510. Stochastic gradient descent and back propagation methods may be implemented as part of the training to update the parameters 510 and improve performance of the motion neural network 502.

In some embodiments, the motion neural network 502 may be trained to compare the biometric motion signatures 512 generated with stored biometric signatures in data storage to determine candidate identities. In some embodiments, the motion neural network 502 may be trained to determine faces depicted in the video data 508 and extract or generate motion information using the video data 508 as input.

Training may involve providing face pixel information 514 to the motion neural network 502 to be used as a ground truth. The face pixel information 514 may be supervised data in which defined face points that are significant for identification of a subject are labeled. In one cycle or iteration of training, the face pixel information 514 may include face pixel information for a single subject or a plurality of subjects. The face pixel information 514 may be provided as a reference or a basis for ground truth for the motion neural network 502. The face motion information 506 may then be provided to train the motion neural network 502 using supervised or unsupervised learning techniques. The face motion information 506 may include face motion for the single subject at different speeds and/or in different directions, such as yaw (horizontal rotation of head relative to camera) and pitch (vertical rotation of head relative to camera). This training may be repeated for a plurality of training cycles that respectively correspond to individual subjects. Using this process, the motion neural network 502 may be trained to generate biometrically invariant motion signatures of subjects. Relative to training a pixel neural network to generate biometrically invariant pixel signatures of subjects, the training procedures for training the motion neural network 502 are less expensive, may utilize a smaller number of samples or individuals, and require less curation of data for provisioning to the motion neural network 502.

The training described with respect to the diagram 500 may also include training to train the motion neural network 502 to generate a biometric signature based on the face pixel information 514. For instance, the biometric motion signature 512 generated may also include parameters based on the defined face points of a subject. In some embodiments, the motion neural network 502 may be trained to generate a separate biometric pixel signature based on face pixel information of a subject, as described elsewhere herein.

Figure 6:
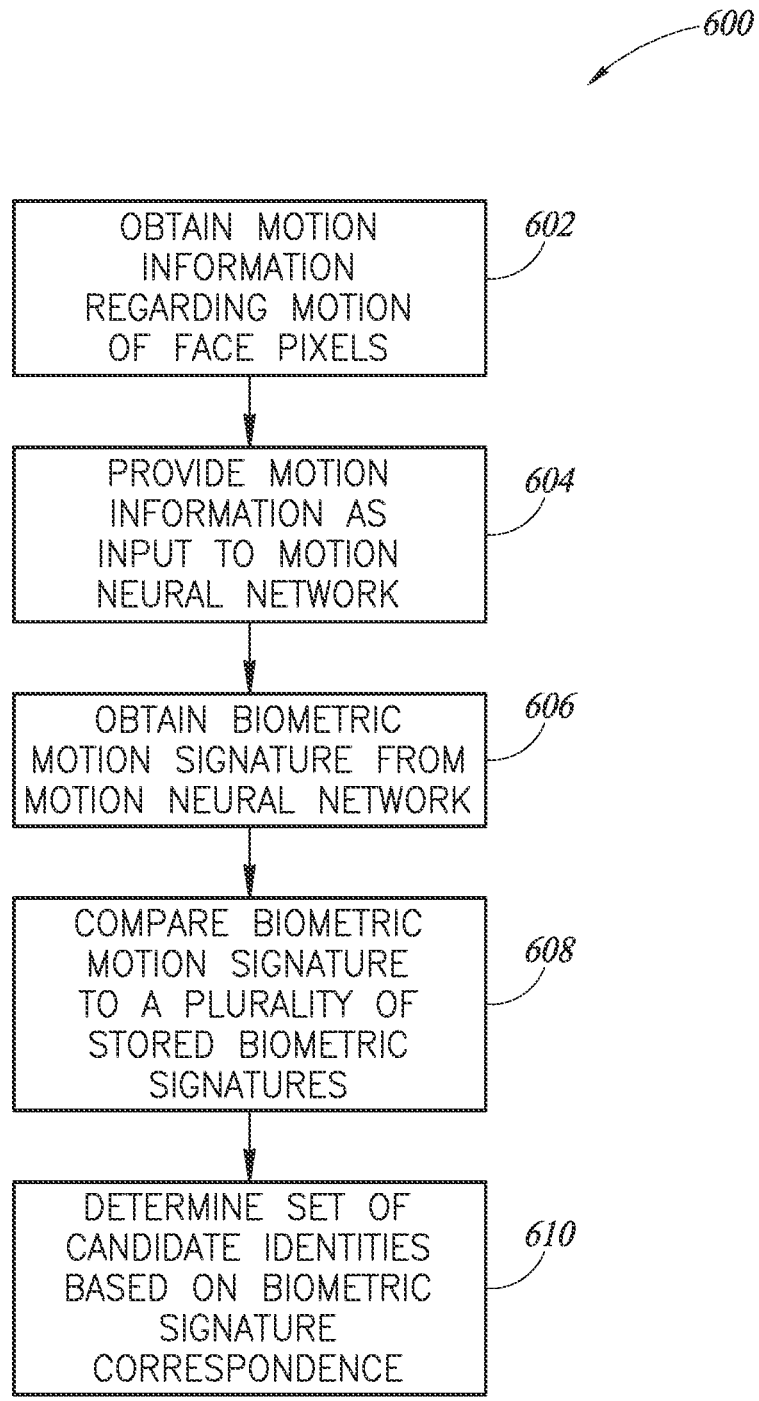
FIG. 6 shows a method for determining the set of candidates according to one or more embodiments.

FIG. 6 shows a method 600 for determining a set of candidate identities according to one or more embodiments. The method 600 may be performed by the computer system 102; however, portions of the method 600 may be performed by an appropriately trained motion neural network, as described herein. The method 600 includes obtaining 602 motion information regarding pixels representative of a defined set of points of a face of a subject. Obtaining 602 may include obtaining video data captured by a camera that depicts movement of a face of a subject in one or more directions. For example, the video data may capture motion of a subject's face moving diagonally upward with respect to a lens of the camera, such that the video data captured encodes motion information for movement in a first direction (e.g., horizontal direction) and encodes motion information for movement in a second direction different than the first direction (e.g. vertical direction). Obtaining 602 may further include identifying pixel sets of the video data that correspond to a face of the subject. For the identified pixel sets corresponding to the face, the computer system 102 may extract motion information from the video data and collect the extracted motion information to provide as input. If the video data does not include or have associated therewith motion information, the computer system 102 may generate the motion information by determining differences in position between pixels in successive frames of the video data that correspond to defined face points for a time difference between the successive frames.

The method 600 may further include providing 604 the motion information as input to the motion neural network. The motion information obtained or otherwise generated in 602 may be provided 604 as a single file, which may comprise several constituent parts. The motion information may be provided 604 over a network to another machine (e.g., computer system) running the motion neural network or may be provided as input within the computer system 102 running the motion neural network.

The method 600 includes obtaining 606 the biometric motion signature from the motion neural network. Thereafter, the method 600 includes comparing the biometric motion signature obtained in 606 to a plurality of biometric motion signatures stored in data storage, such as the motion signature database 216 described herein. Each of the stored biometric signatures may include the same parameters or dimensionality of the biometric motion signature obtained in 606. The computer system 102 may compare parameters of the biometric motion signature obtained in 606 with parameters of each of the stored biometric signatures and determine a similarity score therebetween. The similarity score represents a degree of similarity between corresponding parameters, such as whether the parameters are an exact match or whether the parameters are within a given proximity with each other (e.g., values within 5% of each other). Comparison 608 between the biometric motion signature obtained and the stored biometric motion signatures may involve other methods of comparison than a piecewise comparison (e.g., parameter to parameter comparison). For example, the computer system 102 may implement a fuzzy hashing algorithm or a rolling hash algorithm to determine a similarity of a hash value of the obtained biometric motion signature to hash values of the stored biometric motion signatures. As another example, the computer system 102 may determine similarity between the obtained biometric motion signature and the stored biometric motion signatures based on Euclidean distance between the motion signatures, as described herein.

As a result of or in connection with comparing 608 the biometric motion signatures, the method 600 includes determining 610 a set of candidate identities based on comparison correspondence between the biometric motion signature obtained in 606 and the stored biometric motion signatures. Based on the comparisons between the obtained biometric motion signature and the stored biometric motion signatures, the computer system 102 determines which of the stored biometric motion signatures satisfy a similarity criterion with respect to the biometric motion signature obtained in 606. The similarity criterion may indicate that total amounts of the parameters of the compared signatures differ by less than or equal to a certain amount or percentage, or that an average deviation between the parameters of the compared signatures differs by less than or equal to a certain average value. Other difference metrics may be considered as being within the scope of the present disclosure. The computer system 102 may record, as a candidate identity, identifying information associated with each stored biometric signature that satisfies the similarity criterion. The method 600 concludes as a result of comparing the obtained biometric motion signature with the stored biometric motion signatures. Those of skill in the art will appreciate that the method 600 may include additional operations not described with respect to the method 600.

Figure 7:
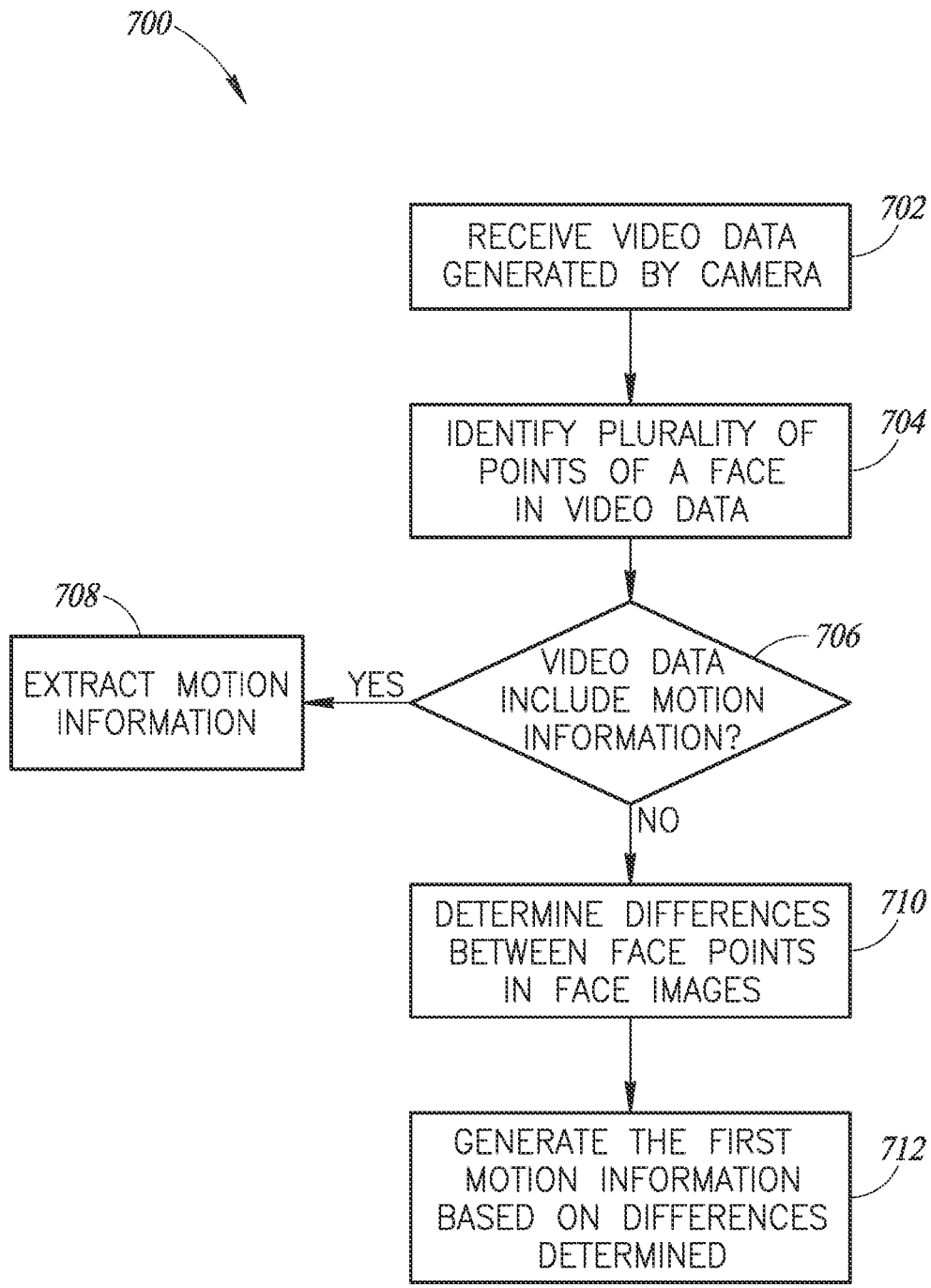
FIG. 7 shows a method for generating the motion information regarding motion of a face according to one or more embodiments.

FIG. 7 shows a method 700 of obtaining motion information from video data according to one or more embodiments. The method 700 may be performed by the computer system 102 or an appropriately trained motion neural network, as described herein. The method 700 includes obtaining video data generated by a camera that captures movement of the face of the subject in one or more directions. The video data may be obtained in 702 via a network (e.g., local area network, wide area network) as a stream of data or as a collection of complete computer files. In some embodiments, the camera 104 may be directly coupled to the computer system 102 and the video data may be obtained in 702 directly therefrom.

The method 700 further includes identifying a set of defined points in a face captured in the video data obtained in 702. In particular, for individual image frames of the video data, the computer system 102 (or motion neural network in some embodiments) may identify a face of a subject and identify defined points in the face, such as a tip of the nose, an iris center, a chin, etc. The set of defined points may be identified according to pixel locations of a center of the defined point or groups of pixels containing the defined points.

The method 700 includes 706 determining whether the video data includes or has associated therewith motion information. Determining 706 may include determining whether the video data is compressed; if the video data is compressed, determining a compression algorithm used; and/or determining a file type of the video data.

If the video data includes motion information, the method 700 proceeds to extract 708 the motion information from the video data. In particular, the system may extract face motion information associated with each of the set of defined points in individual image frames of the video data. The face motion information extracted in 708 may be organized into a predetermined format for processing by the motion neural network. In some instances, even for video data including motion information, each image frame of the video data may not include or have associated therewith motion information. For video frames with missing motion information, the system may substitute the motion information associated with neighboring video frames or calculate or interpolate a representative value from motion information associated with the neighboring frames.

On the other hand, if the motion information is not included in the video data obtained in 702, the system may proceed to generate the face motion information for the defined set of points, as described herein. In particular, the system determines 710 differences between corresponding defined face points of the set of defined points in successive face images of the video data. Referring to FIG. 4, for two face images of the video data, the system may identify the first set of points 401 in the first frame 404 of the video data 106 that correspond to the defined set of points of the face 402 of the subject 108. The system also identifies the second set of points 403 in the second frame 406 of the video data 106 that correspond to the defined set of points of the face 402. This procedure may be repeated for at least a subset of image frames of the video data.

Thereafter, the method 700 includes generating 712 the motion information based on differences between the image frames. For example, referring to FIG. 4, the system may determine a position of a defined face point in the first frame 404 and a position of a corresponding face point in the second frame 406. Motion information for the defined points may then be calculated as the difference between the positions divided by a difference in time between the first frame 404 and the second frame 406, such as a difference between timestamps associated with the respective frames. This procedure may be repeated for each defined face point in the face images of the video data to calculate the face motion information. The face motion information obtained or generated may then be provided as input to the motion neural network to generate the biometric motion signature.

Figure 8:
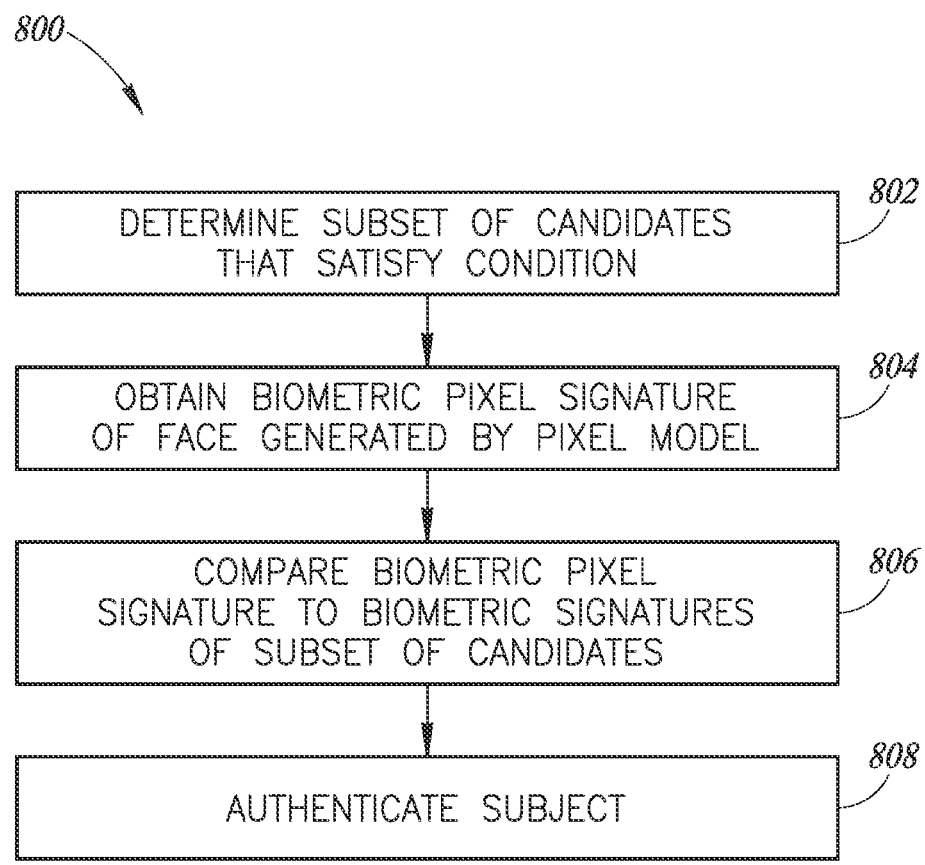
FIG. 8 shows a method for determining an identity of a person using biometric signatures according to one or more embodiments.

FIG. 8 shows a method 800 for authenticating a subject in connection with generating a biometric motion signature according to one or more embodiments. The method may be performed by the computer system 102, by an appropriately trained motion neural network 112, or by some combination thereof. The method 800 may be performed in connection with determining 610 the set of candidate identities of the method 600. The method 800 may include determining a subset of candidates that satisfy a defined condition of the system. For the set of candidate identities determined in 610, the computer system 102 may determine a subset of candidate identities that satisfy one or more defined conditions. In some instances, the total number of candidate identities that satisfy the similarity threshold described with respect to FIG. 6 may exceed a defined number N of candidates. The computer system 102 may select a number of candidates N that have the highest similarity scores among the set of candidate identities determined in 610. This may facilitate reducing a number of biometric pixel comparisons to be performed.

The method 800 includes obtaining 804 a biometric pixel signature generated from image data depicting a face captured in the video data 106. Referring to FIG. 2, pixel data 208 is extracted from the video data 106 corresponding to a face of a subject. The pixel data 208 is provided to the pixel neural network 224, which generates the biometric pixel signature 222 described herein.

The method 800 further includes comparing 806 the biometric pixel signature 222 to a plurality of biometric pixel signatures stored in the pixel signature database 226. Specifically, the biometric pixel signature 222 is compared with the biometric pixel signatures of the set of candidate identities or the subset of candidate identities in 802. For each comparison, the computer system 102 determines whether the biometric pixel signature 222 matches a stored biometric signature of a candidate identity. A match may be determined based on a similarity or proximity in Euclidean space between the signatures—for example, that vectors for the compared signatures satisfy a similarity criterion.

As a result of determining a match between the biometric pixel signature 222 and a stored biometric pixel signature, the method 800 includes authenticating 808 the subject captured by the camera 104. Authenticating may include sending a signal verifying the authenticity of the subject—for instance, that the subject is authorized to access a secured area or that an identity of the subject is verified.

Using motion information from video data facilitates reduction of the processing resources and time taken to authenticate a subject. Previously, motion information associated with motion capture of a subject was often discarded or unused in connection with identification of the subject. The pixel information for a video has a large size relative to the motion information and may take a significant amount of time and number of processing cycles to generate the biometric pixel signature corresponding to the pixel information and determine a match of the biometric pixel signature to a stored biometric signature. By contrast, generating the biometric motion signature and determining a set of candidate identities takes less time and fewer processing cycles due to the smaller size of the motion information. Evaluation using the biometric motion signature filters candidate identities before the biometric pixel signature of the subject's face is considered, eliminating a significant number of candidates who do not have a motion signature matching the biometric motion signature, and thereby improving the efficiency of an authentication procedure.

In some embodiments, the analysis of the biometric motion signature 214 may be performed as liveness verification in connection with verification of the biometric pixel signature 222. That is, the subject 108 may be verified as actually being present in front of the camera 104 (e.g., instead of a photograph) as a result of the biometric motion signature 214 satisfying a similarity criterion with respect to a stored biometric signature in the motion signature database 216.

In some embodiments, the motion neural network 202 and the pixel neural network 224 may be a single neural network that outputs a biometric signature corresponding to face pixels and movement of defined points of a face in the video data. With reference to FIG. 1, for example, the computer system 102 may provide, as input to the neural network 112, face pixel information corresponding to a face image of the subject 108 captured in the video data 106. The face pixel information corresponds to the face pixel information 208 described above with respect to FIG. 2 and elsewhere herein. The face pixel information is provided as input in connection with or as part of the motion information 114 of the face of the subject 108 in the video data 106.

In such embodiments, the neural network 112 generates an enhanced biometric signature that corresponds to a unique biometrically invariant signature for the subject 108 generated based on both the face pixel information and the motion information 114. The enhanced biometric signature may be compared with a plurality of enhanced biometric signatures stored in the data storage 118 that also correspond to face pixel information and motion information for subjects. The computer system 102 or the appropriately trained neural network 112 may authenticate an identity of the subject 108 based on a match between the enhanced biometric signature and one or more enhanced biometric signatures stored in the data storage 118.

Using the enhanced biometric signature to authenticate the subject 108 improves the confidence of an accurate authentication as a result of the additional motion dimensionality of the enhanced biometric signature. This dimensionality does not greatly increase the size or complexity of the input to or the structure of the neural network 112. For instance, to generate the enhanced biometric signature, the input thereto may include an additional 150 (or fewer) inputs for motion vectors, which will not cause a large increase in the number of layers or the nodes of the neural network 112. The enhanced biometric signature may facilitate accurate authentication in suboptimal environments. Certain environmental conditions may decrease the confidence interval for authenticating a subject as a result of lighting, camera angle, etc. The enhanced biometric signature provides additional dimensionality for identifying a subject based on how the structure of the subject's face moves and structural features of the face even when some details of the face are not entirely visible in the video captured.

Figure 9:
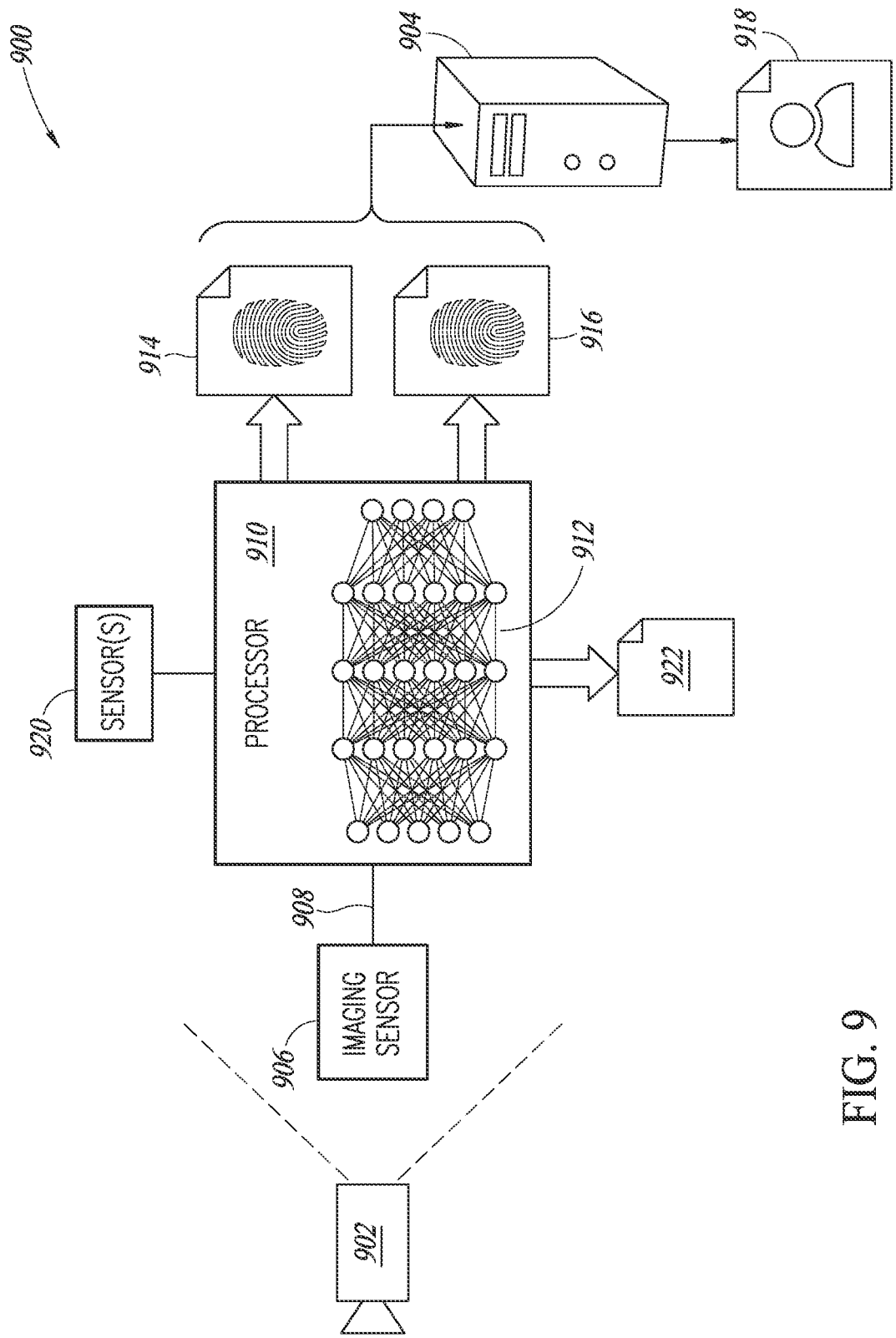
FIG. 9 shows a system for determining a set of candidate identities of a person using a neural network.

Some or all of the systems described herein may be provided in a device that generates one or more types of biometric signatures. FIG. 9 shows a system 900 that includes a camera 902 and a computer system 904 communicatively coupled to receive a set of outputs from the camera. The camera 902 includes an imaging sensor 906 comprising an array of imaging elements (e.g., CMOS elements, CCD elements) that generate image signals 908 based on characteristics of light incident upon the imaging sensor 906. The image signals 908 may encode motion information indicating the motion of face pixels of a face imaged. The camera 902 also includes a processor 910 configured to implement a neural network 912 to generate one or more biometric signatures based on face images detected in the image signals 908. The neural network 912 may detect face images in the image signals 908 and generate biometric pixel signatures 914 corresponding to features of the face of subject(s) detected in the image signals 908, as described with respect to the biometric pixel signature 222 of FIG. 2 and elsewhere herein. The neural network may also generate biometric motion signatures 916 corresponding to motion of particular features of the face of the subject(s) detected in the image signals, as described with respect to the biometric motion signatures 214 of FIG. 2 and elsewhere herein. In some embodiments, the processor 910 may generate motion information encoding the motion of face pixels of a face imaged in the image signals 908. The motion information may be encoded as part of a video signal outputted by the processor 910. The processor 910 may encode the image signals 908 as a compressed image signal encoded according to one or more video compression standards, such as the H.264 or RMHD standards described herein.

The computer system 904 may receive the biometric pixel signature 914 and/or the biometric motion signature 916 generated by the camera 902. The computer system 904 may perform an authentication process to determine identifying information 918 of the subject(s) imaged based on the biometric pixel signature 914 and/or the biometric motion signature 916. The identifying information 918 may specify an identity of the subject(s) imaged or a set of candidate identities of the subject(s) imaged. The identifying information 918 may be generated based on comparison of the biometric pixel signature 914 and/or the biometric motion signature 916 with a plurality of biometric signatures stored in data storage, as described herein. In some embodiments, the computer system may communicate with an external.

The camera 902 may include one or more sensors 920 that detect conditions associated with the camera 902. The sensors 920 are coupled to the processor 910 and provide measurements to the processor 910 indicating the conditions detected. The sensors 920 may include sensors detecting states of the camera 902, such as zoom settings (e.g., a state of a motor that controls optical zoom of the camera lens assembly), focal distance, shutter speed, and aperture, by way of non-limiting example. The sensors 920 may include accelerometers that provide measurements regarding an orientation of the camera 902 or impact or vibration experienced by the camera 902. The sensors 920 may include distance sensors (e.g., LIDAR sensors, radar sensors, time-of-flight sensors) for detecting a distance to a subject or object imaged. Non-limiting examples of other sensor types include acoustic sensors, temperature sensors, and light sensors (e.g., infrared sensors).

The processor 910 may process the measurements received from the one or more sensors 920 and output sensor data 922 in connection with the imaging signal 908, the biometric pixel signature 914, and/or the biometric motion signature 916. The data 922 may be provided as metadata that is correlated with corresponding signals or data. For example, the processor 910 may output the imaging signal 908 with temporal information (e.g., time stamp, image frame number), which may be correlated with measurements in the sensor data 922 that correspond to a time at which an image was obtained.

In some embodiments, the measurements may be provided as input to the neural network 912 in connection with the imaging signal 908, which the neural network 912 may use to generate the biometric pixel signature 914 and/or the biometric motion signature 916. For instance, the neural network 912 may be trained to consider measurements from an accelerometer to account for, e.g., motion, camera settings, distance, etc., of the camera 902 relative to the subject imaged during the time period at which the imaging signal 908 was captured. As another example, the neural network 912 may determine a confidence score of the biometric pixel signature 914 and/or the biometric motion signature 916 based on the sensor data 922. The confidence score may indicate a confidence that the biometric pixel signature 914 and/or the biometric motion signature 916 accurately represent the actual motion and/or pixels of the face captured.

The computer system 904 may use the data 922 in connection with authentication of the subject. For instance, the computer system 904 may determine a confidence of a match between a biometric signature and a stored biometric signature based on a distance of the subject to the camera 910 when the imaging signal 908 was obtained that was used to generate the biometric signature.

In some embodiments, the camera 902 and the computer system 904 may be part of the same device contained in the same housing. For example, the camera 902 and the computer system 904 may be contained within a camera housing and the computer system 904 may provide identifying information as output based on verification of a biometric motion signature of a face captured by the imaging sensor 906. The computer system 904, in such embodiments, may access remotely located data storage (e.g., the motion signature database 216) storing a plurality of biometric motion signatures to authenticate an identity of the subject imaged. In some embodiments, the computer system 904 may be communicatively coupled to the camera 902 via a network (e.g., local area network, wide area network), and the computer system 904 may receive the biometric motion signature 916 from the camera 902 over the network.

The various embodiments described above can be combined to provide further embodiments. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
one or more processors; and
memory configured to store computer instructions that, when executed by the one or more processors, cause the system to:
obtain a plurality of image sets of a plurality of faces, wherein each corresponding image set of the plurality of image sets includes a first image of a corresponding face and a second image of the corresponding face;
generate a biometric profile for each corresponding face of the plurality of faces based on the corresponding image set, including:
determine a first set of motion information indicating motion of the corresponding face in a first direction from the first image to the second image of the corresponding image set; and
determine a second set of motion information indicating motion of the corresponding face in a second direction from the first image to the second image of the corresponding image set, wherein the second direction is different from the first direction; and
train, from the biometric profiles generated from the plurality of image sets, a motion neural network that generates candidate identities for a face in a target image.

2. The system of claim 1, wherein execution of the computer instructions further cause the system to:
capture a third image and a fourth image of a target face;
determine first motion information indicating motion of the target face in the first direction from the third image to the fourth image; and
determine second motion information indicating motion of the target face in the second direction from the third image to the fourth image; and
employ the trained motion neural network with the first motion information and the second motion information to identify one or more candidate identities for the target face.

3. The system of claim 2, wherein execution of the computer instructions further cause the system to:
verify a liveness of a person associated with the target face based on a similarity criterion between a biometric signature generated by the trained motion neural network and a stored biometric motion signature.

4. The system of claim 2, wherein execution of the computer instructions further cause the system to:
authenticate an identity of a person associated with the target face based on a similarity between a biometric signature generated by the trained motion neural network and a stored biometric signature.

5. The system of claim 1, wherein execution of the computer instructions to generate the biometric profile for each corresponding face of the plurality of faces further cause the system to:
generate a pattern of values that represents movement characteristics of the corresponding face from the first image to the second image of the corresponding image set based on the first set of motion information and the second set of motion information of the corresponding face.

6. The system of claim 1, wherein execution of the computer instructions to train the motion neural network further cause the system to:
define face points within the first image and the second image of a subset of the plurality of image sets as supervised training data.

7. The system of claim 1, wherein execution of the computer instructions to train the motion neural network further cause the system to:
train, from the biometric profiles generated from the plurality of image sets, the motion neural network to generate biometric pixel signatures based on face pixel information of the face in the target image.

8. The system of claim 1, wherein execution of the computer instructions to determine the first set of motion information for the corresponding face further cause the system to:
identify a horizontal speed of rotation of the corresponding face relative to a camera that captured the first and second images of the corresponding image set for the corresponding face.

9. The system of claim 1, wherein execution of the computer instructions to determine the second set of motion information for the corresponding face further cause the system to:
identify a vertical speed of rotation of the corresponding face relative to a camera that captured the first and second images of the corresponding image set for the corresponding face.

10. A method comprising:
capturing a plurality of image sets of a plurality of faces, wherein each corresponding image set of the plurality of image sets includes a first image of a corresponding face and a second image of the corresponding face;
generating, for each corresponding face of the plurality of faces, a biometric profile that is representative of movement of the corresponding face based on motion of the corresponding face in a first direction and in a second direction from the first image to the second image of the corresponding image set for the corresponding face, wherein the second direction is different from the first direction;
training, based on the biometric profiles generated from the plurality of image sets, a motion neural network to generate candidate identities for a target face;
capturing a third image and a fourth image of the target face;
determining first motion information indicating motion of the target face in the first direction from the third image to the fourth image;

determining second motion information indicating motion of the target face in the second direction from the third image to the fourth image; and employing the trained motion neural network with the first motion information and the second motion information to identify one or more candidate identities for the target face.

11. The method of claim 10, wherein employing the trained motion neural network to identify the set of candidate identities further comprises:

generating a target biometric signature of the target face to represent movement of the target face based on the first motion information and the second motion information; and verifying a liveness of a person associated with the target face based on a similarity criterion between the generated target biometric signature and a stored biometric motion signature.

12. The method of claim 10, wherein employing the trained motion neural network to identify the set of candidate identities further comprises:

generating a target biometric signature of the target face to represent movement of the target face based on the first motion information and the second motion information; and authenticating an identity of a person associated with the target face based on a similarity between the generated target biometric signature and a stored biometric signature.

13. The method of claim 10, wherein generating the biometric profile for each corresponding face further comprises:

generating a pattern of values that represents movement characteristics of the corresponding face from the first image to the second image of the corresponding image set based on the first set of motion information and the second set of motion information of the corresponding face.

14. The method of claim 10, wherein training the motion neural network further comprises:

defining face points within the first image and the second image of at least a subset of the plurality of image sets as supervised training data.

15. The method of claim 10, wherein training the motion neural network further comprises:

training, from the biometric profiles, the motion neural network to generate biometric pixel signatures based on face pixel information of the target face.

16. A non-transitory computer-readable medium storing computer instructions that, when executed by at least one processor, cause the at least one processor to perform actions, the actions comprising:

capturing a first image and a second image of a target face;

determining first motion information indicating motion of the target face in a first direction from the first image to the second image;

determining second motion information indicating motion of the target face in a second direction from the first image to the second image;

employing a trained motion neural network to generate a biometric signature representing movement characteristics of the target face based on the first motion information and the second motion information; and verifying a liveness of a person associated with the target face based on a similarity criterion between the generated biometric signature and a stored biometric signature.

17. The non-transitory computer-readable medium of claim 16, further comprising:

authenticating an identity of the person associated with the target face based on the similarity criterion between the generated biometric signature and a stored biometric signature.

18. The non-transitory computer-readable medium of claim 16, wherein generating the biometric signature of the target face further comprises:

generating a pattern of values that represents movement characteristics of the target face from the first image to the second image based on the first motion information and the second motion information of the target face.

19. The non-transitory computer-readable medium of claim 16, further comprising:

capturing a plurality of image sets of a plurality of faces, wherein each corresponding image set of the plurality of image sets includes a third image of a corresponding face and a fourth image of the corresponding face;

generating a plurality of biometric profiles for the plurality of faces based on motion of the corresponding face in the first direction and in the second direction from the third image to the fourth image of the corresponding image set for the corresponding face; and training, based on the biometric profiles generated from the plurality of image sets, a neural network as the trained motion neural network.

20. The non-transitory computer-readable medium of claim 19, wherein generating the plurality of biometric profiles further comprises:

generating, for each corresponding face of each corresponding biometric profile, a pattern of values that represents movement characteristics in the first direction and in the second direction of the corresponding face from the third image to the fourth image of the corresponding image set.

* * * * *